(12) United States Patent
Dickens

(10) Patent No.: US 11,225,980 B2
(45) Date of Patent: Jan. 18, 2022

(54) IONIZING FLUIDIC ACCELERATOR AND METHODS OF USE

(71) Applicant: WildSpark Technologies, LLC, Austin, TX (US)

(72) Inventor: Andrew Paul Dickens, Austin, TX (US)

(73) Assignee: WILDSPARK TECHNOLOGIES, LLC, Austin, TX (US)

( * ) Notice: Subject to any disclaimer, the term of this patent is extended or adjusted under 35 U.S.C. 154(b) by 185 days.

(21) Appl. No.: 16/362,389

(22) Filed: Mar. 22, 2019

(65) Prior Publication Data

US 2020/0300271 A1     Sep. 24, 2020

(51) Int. Cl.
*F04D 33/00* (2006.01)
*H01J 41/12* (2006.01)
*H01J 11/12* (2012.01)

(52) U.S. Cl.
CPC .............. *F04D 33/00* (2013.01); *H01J 11/12* (2013.01)

(58) Field of Classification Search
CPC ................................ F04D 33/00; H01J 41/12
See application file for complete search history.

(56) References Cited

U.S. PATENT DOCUMENTS

| 6,449,941 | B1* | 9/2002 | Warboys | ............... | F03H 1/0025 |
| | | | | | 60/202 |
| 10,219,364 | B2 | 2/2019 | Dickens | | |
| 10,236,163 | B1 | 3/2019 | Dickens | | |
| 2003/0090209 | A1 | 5/2003 | Krichtafovitch et al. | | |
| 2008/0277592 | A1* | 11/2008 | Xiao | ....................... | H01J 27/26 |
| | | | | | 250/423 R |
| 2009/0108727 | A1* | 4/2009 | Nomura | ................ | H01J 29/467 |
| | | | | | 313/310 |
| 2010/0116469 | A1 | 5/2010 | Jewell-Larson et al. | | |
| 2011/0265832 | A1 | 11/2011 | Honer et al. | | |
| 2015/0240797 | A1* | 8/2015 | Tin | ........................ | F04B 19/006 |
| | | | | | 417/49 |
| 2018/0324938 | A1 | 11/2018 | Dickens | | |

OTHER PUBLICATIONS

Search Report and Written Opinion, International Application No. PCT/US2020/023668, dated Jul. 10, 2020, 10 pages.

* cited by examiner

*Primary Examiner* — Connor J Tremarche
(74) *Attorney, Agent, or Firm* — Baker Botts L.L.P.

(57) ABSTRACT

The present disclosure describes systems and methods for using an ionizing fluidic accelerator that may encompass the use of an ionizing fluidic accelerator including a substrate, an electron emitter having a negative bias and being formed on the substrate, an anode having a positive bias and being formed on the substrate, and an attractor having a negative bias and being formed on the substrate. The electron emitter and the anode may be separated in a first direction and the negative bias of the electron emitter and the positive bias of the anode may produce a first electric field in the first direction. The anode and the attractor may be separated in a second direction, the positive bias of the anode and the negative bias of the attractor may produce a second electric field in the second direction, and the second direction may be orthogonal to the first direction.

20 Claims, 13 Drawing Sheets

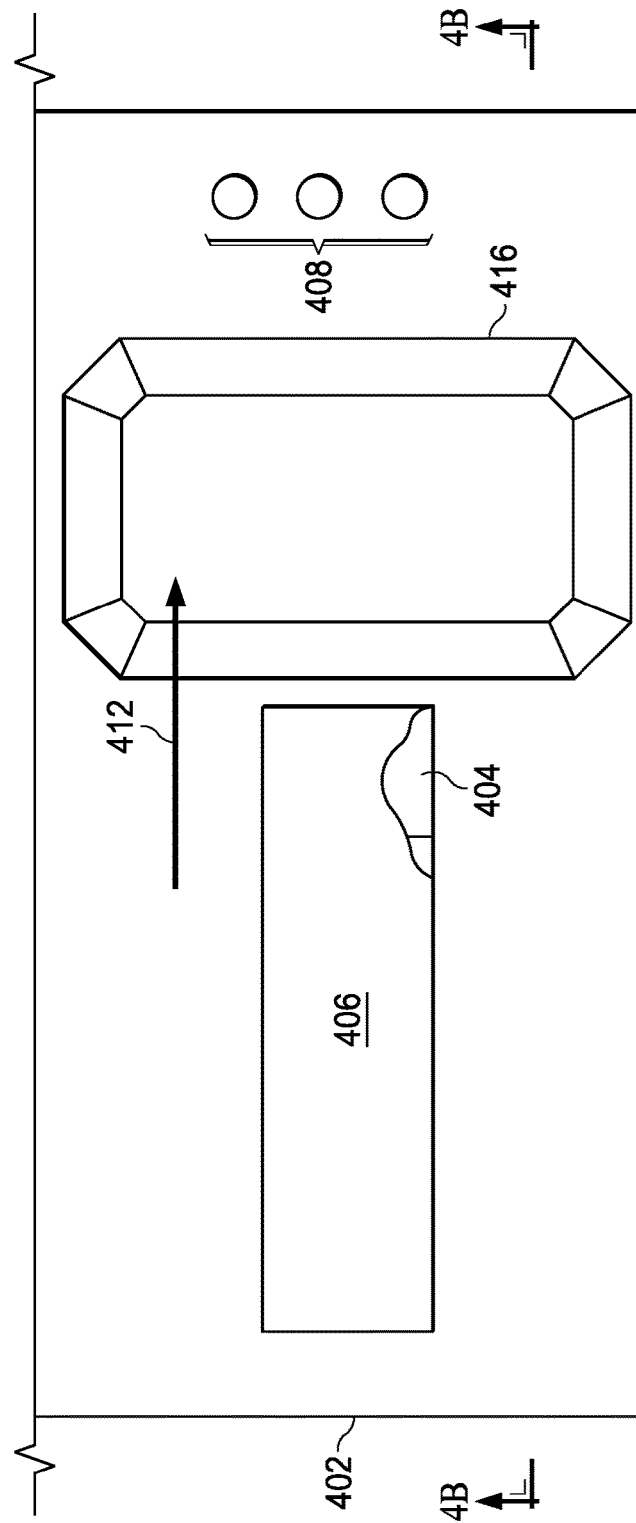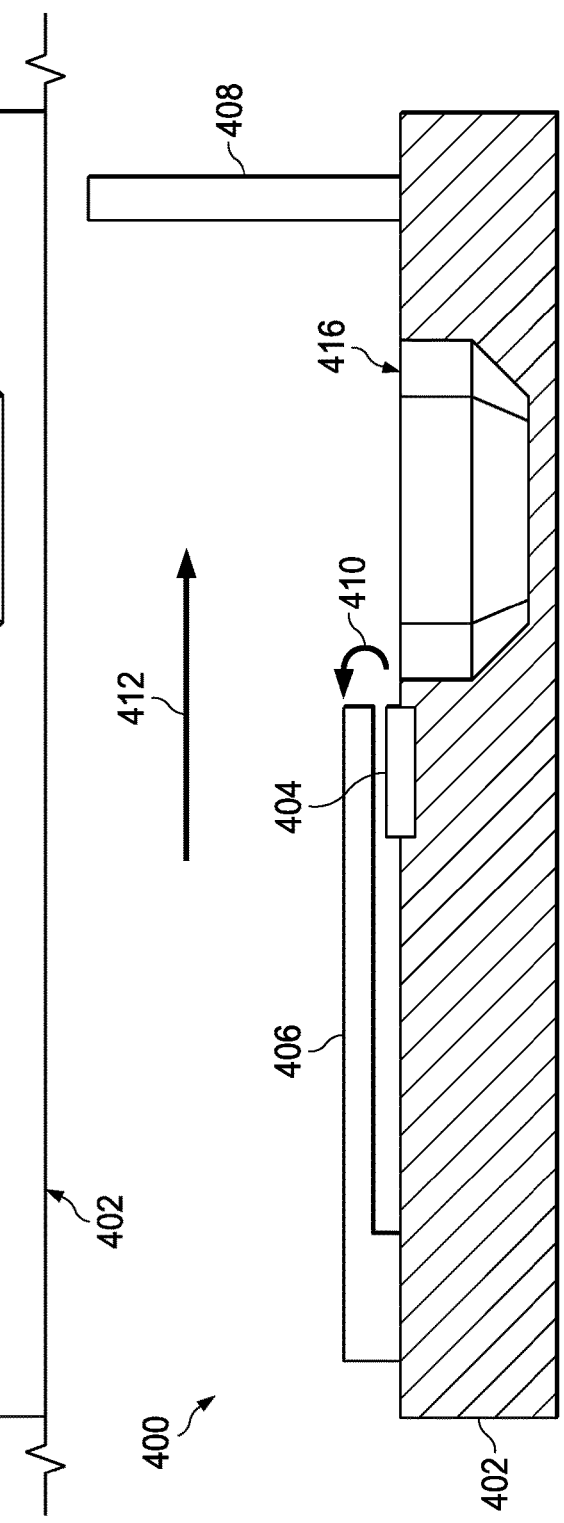
FIG. 4A
FIG. 4B

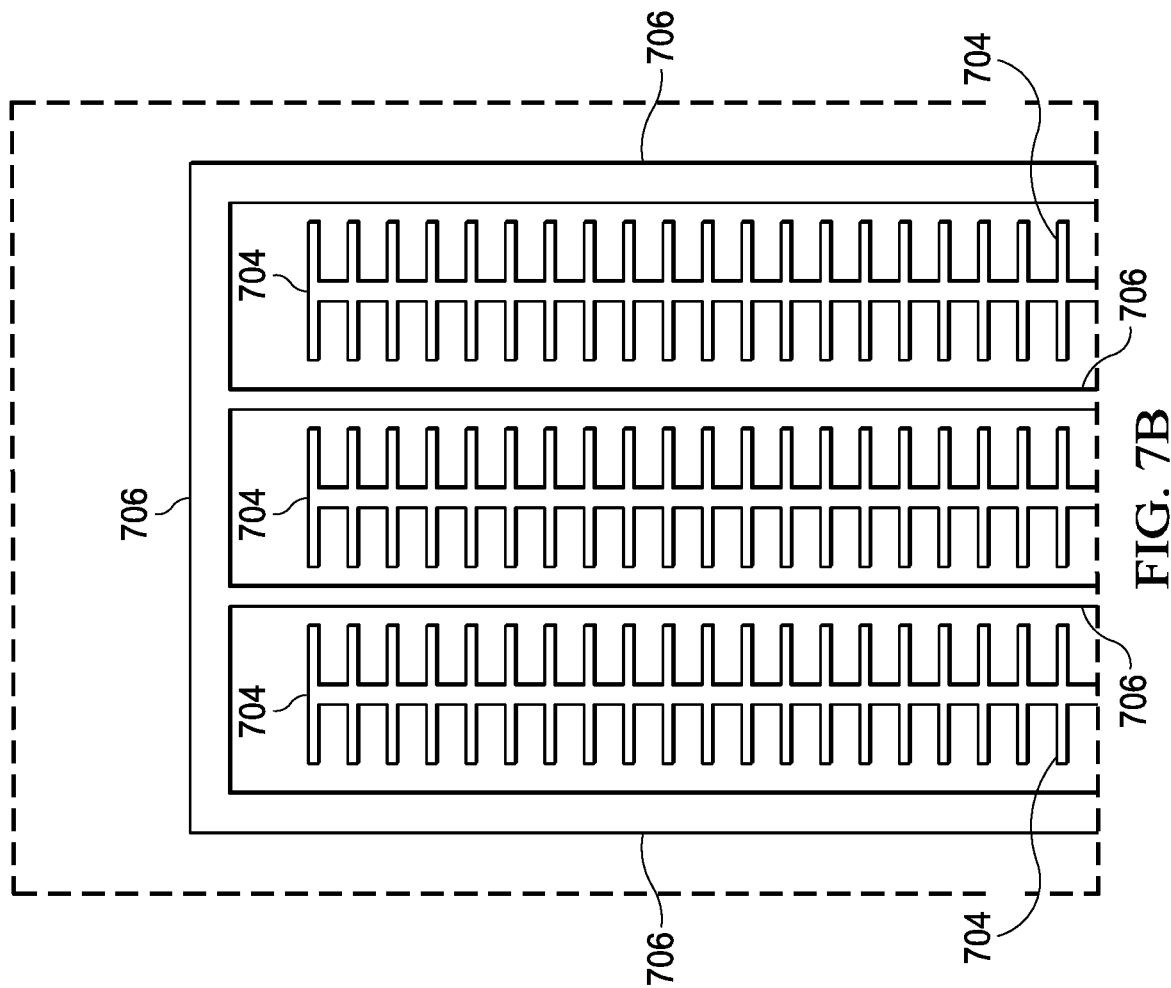

IONIZING FLUIDIC ACCELERATOR AND METHODS OF USE

TECHNICAL FIELD

The present disclosure relates to semiconductor systems and methods of use, and more specifically, to semiconductor systems for and methods of ionizing and accelerating fluids.

BACKGROUND

There are numerous applications that require or benefit from the acceleration of a fluid, including, but not limited to, hydraulics, cooling systems, aerodynamics, and propulsion systems. These applications would benefit from a system that rapidly accelerates a fluid without the use of moving mechanical components and provides highly responsive, complex fluid flow over a wide variety of complex surfaces.

SUMMARY

The present disclosure provides an ionizing fluidic accelerator including a substrate, an electron emitter having a negative bias and being formed on the substrate, an anode having a positive bias and being formed on the substrate, and an attractor having a negative bias and being formed on the substrate. The electron emitter and the anode may be separated in a first direction and the negative bias of the electron emitter and the positive bias of the anode may produce a first electric field in the first direction. The anode and the attractor may be separated in a second direction, the positive bias of the anode and the negative bias of the attractor may produce a second electric field in the second direction, and the second direction may be orthogonal to the first direction. The first electric field may cause negatively charged particles to flow in the first direction from the electron emitter toward the anode. The second electric field may cause positively charged particles to flow in the second direction from the anode to the attractor.

The system may further include the following additional features, which may be used in any combinations with one another unless clearly mutually exclusive. The attractor may include a plurality of attractors. The electron emitter may have a first height relative to the substrate, the anode may have a second height relative to the substrate, and the attractor may have a third height relative to the substrate, and the third height may be substantially greater than the first height and the second height. The electron emitter may have a first height relative to the substrate, the anode may have a second height relative to the substrate, and the attractor may have a third height relative to the substrate, and the second height may be substantially greater than the first height and the third height. The electron emitter may be formed from a plurality of materials layered together. The plurality of materials may include a plurality of surfaces, each of the plurality of surfaces may have an irregular surface profile, and at least one of the plurality of materials may have a high electron emissivity. The at least one of the plurality of materials having a high electron emissivity may be lanthanum hexaboride. The electron emitter may include a plurality of electron emitters. The electron emitter may be positioned remotely from the anode. The ionizing fluidic accelerator may include a buffer electrode positioned between the electron emitter and the anode in the first direction. The anode may include a cantilever structure positioned vertically over the electron emitter. The electron emitter may include a plurality of electron emitters, the anode may include a plurality of anodes, the attractor may include a plurality of attractors, and the plurality of electron emitters, the plurality of anodes, and the plurality of attractors may be configured in a repeating array. The first electric field may cause negatively charged particles to flow in the first direction from the electron emitter toward the anode within a first region, the second electric field may cause positively charged particles to flow in the second direction from the anode to the attractor within a second region, and the second region may be separate from the first region.

The present disclosure also provides a vertical lift system including a payload, a plurality of ionizing fluidic accelerators positioned on a surface of the payload, each of the plurality of ionizing fluidic accelerators including a substrate, an electron emitter having a negative bias and being formed on the substrate, an anode having a positive bias and being formed on the substrate, and an attractor having a negative bias and being formed on the substrate. The electron emitter and the anode may be separated in a first direction and the negative bias of the electron emitter and the positive bias of the anode may produce a first electric field in the first direction. The anode and the attractor may be separated in a second direction, the positive bias of the anode and the negative bias of the attractor may produce a second electric field in the second direction, and the second direction may be orthogonal to the first direction. The first electric field may cause negatively charged particles to flow in the first direction from the electron emitter toward the anode, and the second electric field may cause positively charged particles to flow in the second direction from the anode to the attractor. The plurality of ionizing fluidic accelerators may generate fluid flow and provide directional thrust control for the payload.

The system may further include the following additional features, which may be used in any combinations with one another unless clearly mutually exclusive. The payload may be a spherical shape. The payload may be a cube shape. The electron emitter may include a plurality of electron emitters, the anode may include a plurality of anodes, the attractor may include a plurality of attractors, and the plurality of electron emitters, the plurality of anodes, and the plurality of attractors may be configured in a repeating array. The electron emitter may be formed from a plurality of materials layered together, the plurality of materials may include a plurality of surfaces, each of the plurality of surfaces may have an irregular surface profile, and at least one of the plurality of materials may have a high electron emissivity. The first electric field may cause negatively charged particles to flow in the first direction from the electron emitter toward the anode within a first region, and the second electric field may cause positively charged particles to flow in the second direction from the anode to the attractor within a second region, wherein the second region may be separate from the first region.

The present disclosure further provides a method of using an ionizing fluidic accelerator including negatively biasing an electron emitter such that the electron emitter emits electrons, positively biasing an anode, separating the electron emitter and the anode in a first direction, producing a first electric field in the first direction between the negative bias of the electron emitter and the positive bias of the anode, causing electrons emitted by the electron emitter to flow in the first direction toward the anode, interact with a fluid, and generate positively charged ions in the fluid, negatively biasing an attractor, separating the anode and the attractor in a second direction orthogonal to the first direction, producing a second electric field in the second direction between the positive bias of the anode and the negative bias of the attractor, causing the positively charged ions in the fluid to flow in the second direction toward the attractor and interact with the fluid, and generating fluid flow as the positively charged ions in the fluid and a portion of the fluid move in the second direction toward the attractor.

Any of the above systems may be operated using any of the above methods and any of the above methods may be applied to any of the above systems.

BRIEF DESCRIPTION OF THE DRAWINGS

For a more complete understanding of the present disclosure and the associated features and advantages described herein, reference is now made to the following description, taken in conjunction with the accompanying drawings, which are not to scale, in which like numerals refer to like features, and in which:

FIG. 4A is a top perspective view of another example system for ionizing and accelerating fluids;

FIG. 4B is a side perspective view of the example system for ionizing and accelerating fluids shown in FIG. 4A;

FIG. 7B is a detail top perspective view of the example array of systems for ionizing and accelerating fluids shown in FIG. 7A;

DETAILED DESCRIPTION

Figure 1A:
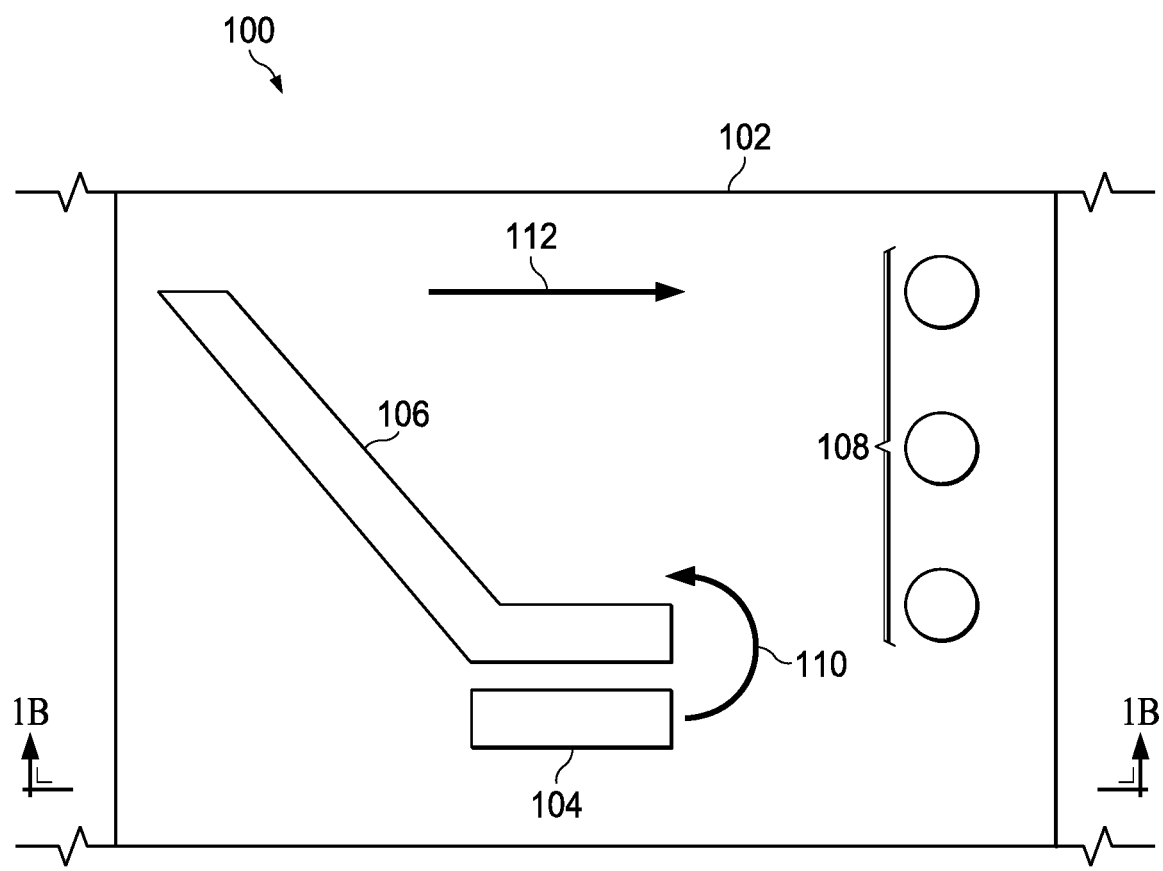
FIG. 1A is a top perspective view of an example system for ionizing and accelerating fluids.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The disclosed semiconductor systems and methods of use may provide improved response time and flexibility in configuring systems for providing accelerated fluid flow by utilizing fluid ionization and electrostatic fluid acceleration. This avoids the need for moving mechanical parts to generate fluid movement. Using a system or method of the present disclosure, fluid may be accelerated with reduced noise and energy use and with increased precision and flexibility.

Systems of the present disclosure typically include a semiconductor system including a substrate, an electron emitter, an anode, and an attractor. The electron emitter generates a high concentration of electrons that are attracted to the anode and pass through and interact with a fluid in close proximity to the semiconductor system. As the electrons interact with the fluid, molecules of the fluid become ionized and are attracted to the attractor. As the ionized molecules of the fluid are accelerated between the anode and the attractor, the ionized molecules interact with and accelerate further molecules of the fluid and, thus, fluid flow is generated. Example systems and components are described in greater detail in FIG. 1 through FIG. 13C. However, aspects of these systems and components may be combined with one another and with systems and components otherwise described herein, but not illustrated in the FIGURES.

FIG. 1A illustrates a top perspective view of an example system for ionizing and accelerating fluids 100. System 100 includes a substrate 102, an electron emitter 104, an anode 106, and attractors 108. Substrate 102 may be formed from a dielectric material, other material suitable for acting as a support during semiconductor processing, or other material suitable for acting as an electrical insulator or possessing a high dielectric breakdown voltage. For example, substrate 102 may be formed from silicon, glass, sapphire, or silicon carbide (SiC). For further example, substrate 102 may be formed from a first material having a thin film of diamond applied thereon. Substrate 102 may also be formed from a material selected based on whether active electrical components (e.g., transistors, capacitors, resistors, etc.) may be built on the substrate. Electron emitter 104 may be formed on substrate 102, may be connected to an electrical power source, and may be negatively biased. Electron emitter 104 may emit electrons when electrical current is applied thereto. Electron emitter 104 may be formed from a number of materials layered together, as described in further detail below with reference to FIGS. 2A and 2B. The material selected to form electron emitter 104 may be selected such that a large number of electrons are emitted and a high concentration of electrons (e.g., an electron cloud) is produced in proximity to electron emitter 104 when electrical current is applied thereto. For example, the material may be suitable to produce electron concentrations on the order of approximately $10^{14}$ to approximately $10^{18}$ electrons per cubic meter. The electron cloud may be produced in a spherical region proximate to electron emitter 104 and may have a decreasing electron density with increasing distance from electron emitter 104. Electron emitter 104 may also be formed having dimensions such that a large number of electrons are emitted. For example, electron emitter 104 may be between approximately 1 and approximately 2 micrometers thick and approximately 5 micrometers long.

Anode 106 may be formed on substrate 102, may be connected to an electrical power source, and may be positively biased such that negatively charged particles, e.g., electrons emitted by electron emitter 104, may be attracted to anode 106. Anode 106 may be formed from a metal or other durable material. For example, anode 106 may be formed from tungsten, titanium nitride, ceramics, including those based on yttrium, iridium, rhodium, and lanthanoids, and oxides, nitrides, carbides, borides, and halides of yttrium, iridium, rhodium and lanthanoids, or various other materials that are resistant to ion bombardment, particularly by oxygen and nitrogen ions. As shown in FIG. 1A, anode 106 may have an angled upper portion and a lower straight portion. However, anode 106 may be configured in different positions and/or orientations in various other embodiments. Anode 106 may be formed having dimensions such that an electric field having enough strength to pull electrons from electron emitter 104 may be produced. For example, the angled upper portion of anode 106 may have an angle of approximately 45 degrees, be approximately 10 micrometers long, approximately 10 micrometers wide, and between approximately 1 and approximately 2 micrometers thick. Also, for example, the lower straight portion of anode 106 may be between approximately 1 and approximately 2 micrometers thick and approximately 5 micrometers long. As shown in FIG. 1A, electron emitter 104 and anode 106 may be positioned in relatively close proximity. For example, electron emitter 104 may be separated from anode 106 by between approximately 100 nanometers and approximately 300 nanometers. The separation between electron emitter 104 and anode 106 may be selected based on how effectively electron emitter 104 produces electrons, with larger separations being possible with more effective emitters. Positioning electron emitter 104 and anode 106 in close proximity may allow for field emission at a lower voltage differential between the bias of electron emitter 104 and the bias of anode 106. Positioning electron emitter 104 and anode 106 in close proximity may decrease the potential damage from ion bombardment of electron emitter 104.

Attractors 108 may be formed on substrate 102, may be connected to an electrical power source, and may be negatively biased such that positively charged particles, e.g., positively charged fluid ions, may be attracted to attractors 108. As shown in FIG. 1A, attractors 108 includes three attractors 108. However, attractor 108 may include more or fewer attractors 108 or may be a single attractor 108 in various other embodiments. Attractors 108 are shown having a round cross-section and are also shown being equally spaced from one another. However, attractors 108 may have different cross-sections and/or have variable spacing in various other embodiments. The number, cross-section, spacing, and dimensions of attractors 108 may be selected such that an electric field having appropriate strength may be produced between anode 106 and attractors 108. For example, attractors 108 may be spaced approximately 5 micrometers from each other and may be between approximately 1 and approximately 2 micrometers in diameter. Attractors 108 may be formed from a metal or other durable material. For example, attractors 108 may be formed from tungsten, titanium nitride, ceramics, including those based on yttrium, iridium, rhodium, and lanthanoids, and oxides, nitrides, carbides, borides, and halides of yttrium, iridium, rhodium and lanthanoids, or various other materials that are resistant to ion bombardment, particularly by oxygen and nitrogen ions. As shown in FIG. 1A, attractors 108 may be positioned some distance from both anode 106 and electron emitter 104. For example, attractors 108 may be separated from anode 106 by between approximately 10 and approximately 20 micrometers at the nearest point.

Figure 1B:
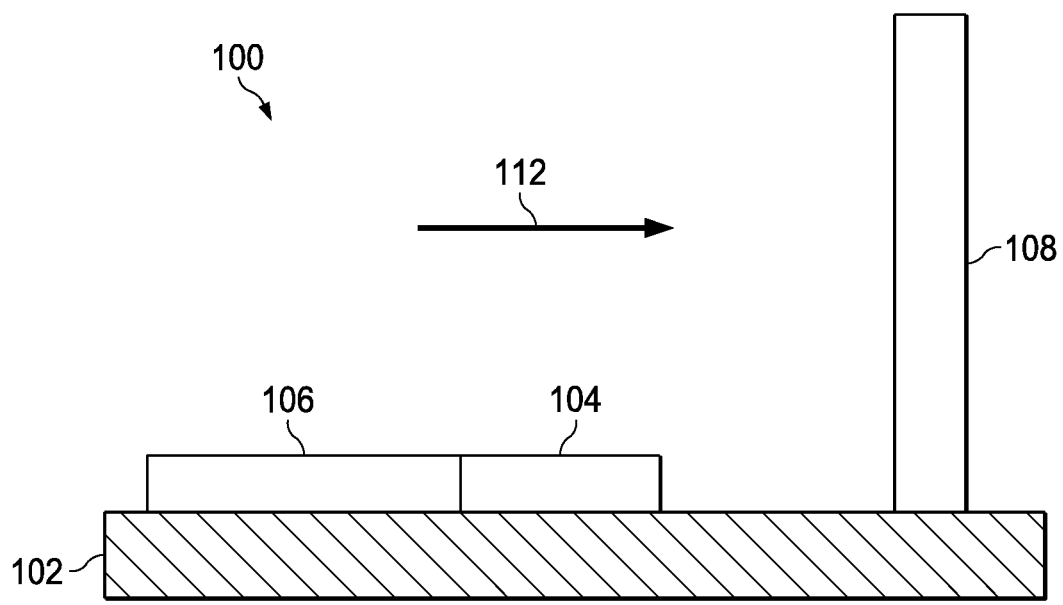
FIG. 1B is a side perspective view of the example system for ionizing and accelerating fluids shown in FIG. 1A.

FIG. 1B illustrates a side perspective view of system 100 also shown in FIG. 1A. As shown in FIG. 1B, electron emitter 104, anode 106, and attractors 108 may all have various heights relative to the surface of substrate 102. For example, in some embodiments, electron emitter 104, anode 106, and attractors 108 may have the same or similar heights. For example, in some embodiments, electron emitter 104, anode 106, and attractors 108 may be between approximately 1 and approximately 2 micrometers in height. In other embodiments, electron emitter 104 and anode 106 may have the same of similar heights while attractors 108 may have a larger height. For example, in some embodiments, electron emitter 104 and anode 106 may be between approximately 1 and approximately 2 micrometers in height while be approximately 10 micrometers in height. In other embodiments, electron emitter 104 and anode 106 may also have different heights. The heights of electron emitter 104, anode 106, and attractors 108 may be selected such that electric fields having appropriate strength may be formed between electron emitter 104 and anode 106 and between anode 106 and attractors 108.

Given that electron emitter 104 is negatively biased and anode 106 is positively biased, an electrical field is produced between electron emitter 104 and anode 106 that pulls negatively charged particles in the direction of arrow 110 when electrical current is applied to electron emitter 104 and anode 106. When electrons are emitted by electron emitter 104, the electric field causes these electrons to move in the direction of the electric field, i.e., in the direction of arrow 110. The magnitude of bias applied to electron emitter 104 and anode 106 may be selected such that an electric field having enough strength to pull electrons from electron emitter 104 may be produced. The magnitude of bias applied to electron emitter 104 may also be selected such that a large number of electrons are emitted and a high concentration of electrons (e.g., an electron cloud) is produced. For example, electron emitter 104 may have a differential bias between approximately 10 Volts and approximately 20 Volts relative to the bias of anode 106.

As electrons emitted by electron emitter 104 are pulled in the direction of arrow 110, the electrons pass through and interact with a fluid. For example, the fluid may be air or other gas in some embodiments. For further example, the fluid may be a liquid that is injected into system 100 such that system 100 may be suitable for use in an environment such as a vacuum or in space in some embodiments. When electrons collide with fluid particles, the collision may cause electrons to become unbound from the fluid particles. When these electrons detach from the fluid particles, these particles become positively charged ions.

Given that anode 106 is positively biased and attractors 108 are negatively biased, an electrical field is produced between anode 106 and attractors 108 that pulls positively charged particles in the direction of arrow 112 when electrical current is applied to anode 106 and attractors 108. When electrons emitted by electron emitter 104 collide with fluid particles and created positively charged ions, the electric field causes these ions to move in the direction of the electric field, i.e., in the direction of arrow 112. In some embodiments, a small number of fluid particles will become ionized. For example, one part in one million or one part in ten million of the fluid will become ionized through interaction with the electrons emitted by electron emitter 104. However, as these positively charged ions move in the direction of arrow 112, the ions will collide with and interact with the rest of the fluid, including neutral particles. In this way, fluid flow may be generated as all molecules within a region in proximity to substrate 102 are accelerated in the direction of arrow 112. In some embodiments, fluid flow may be generated in a region up to 5 micrometers above substrate 102.

As discussed above, attractors 108 may be positioned some distance from both anode 106 and electron emitter 104. This distance, and other operating parameters of system 100, including, e.g., magnitude of biases of electron emitter 104, anode 106, and attractors 108, may be selected such that fluid flow may be generated at a specific velocity and/or over a specific distance of acceleration. For example, in some embodiments, attractors 108 may be positioned such that fluid flow may be generated at velocities on the order of meters per second to tens of meters per second after being accelerated over a distance between approximately 10 and approximately 20 micrometers.

Figure 2A:
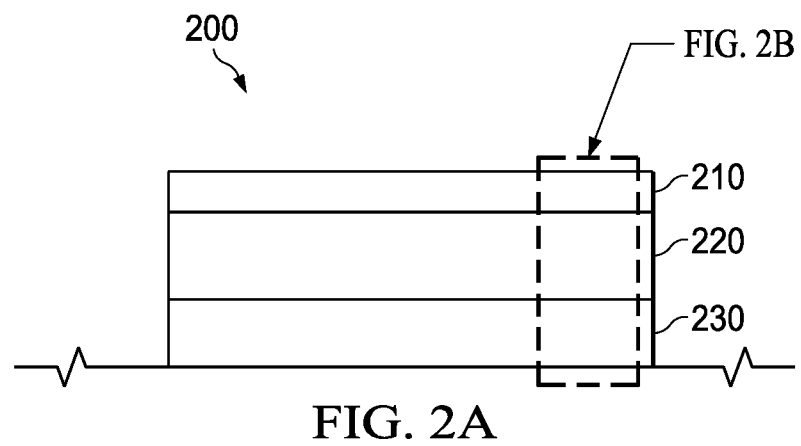
FIG. 2A is a cross-sectional view of an example electron emitter of a system for ionizing and accelerating fluids.

FIG. 2A illustrates a cross-sectional view of an example electron emitter 200. Electron emitter 200 may be included and used in a system for ionizing and accelerating fluids. For example, electron emitter 200 may be included in system 100, described above, and may function similarly to electron emitter 104, as described above. As shown in FIG. 2A, electron emitter 204 may be formed from a number of materials layered together. In some embodiments, the upper layer 210 of electron emitter 200 may be formed from a material that emits a high number of electrons (i.e., has a high electron emissivity or has a low work function) when electrical current is applied thereto. For example, in some embodiments, upper layer 210 may be formed from lanthanum hexaboride ($LaB_6$), tungsten, titanium nitride, or ceramics, including those based on yttrium, iridium, rhodium, and lanthanoids, and oxides, nitrides, carbides, borides, and halides of yttrium, iridium, rhodium and lanthanoids having low work functions. In other embodiments, upper layer 210 may be formed from other materials having high electron emissivity. In some embodiments, layer 220 of electron emitter 200 may be formed from a metal or other durable material. For example, layer 220 may be formed from tungsten, titanium nitride, ceramics, including those based on yttrium, iridium, rhodium, and lanthanoids, and oxides, nitrides, carbides, borides, and halides of yttrium, iridium, rhodium and lanthanoids, or various other materials that are resistant to ion bombardment, particularly by oxygen and nitrogen ions. In some embodiments, base layer 230 of electron emitter 200 may be formed from a dielectric material. For example, base layer 230 may be formed from an oxide or from diamond. In some embodiments, base layer 230 may be formed from a dielectric material that is conductive. For example, base layer 230 may be formed from oxide or diamond having concentrations of boron or other doping materials included therein. Although electron emitter 200 is shown in FIG. 2A as having three layers, electron emitter 200 may include more or fewer layers in various other embodiments.

Figure 2B:
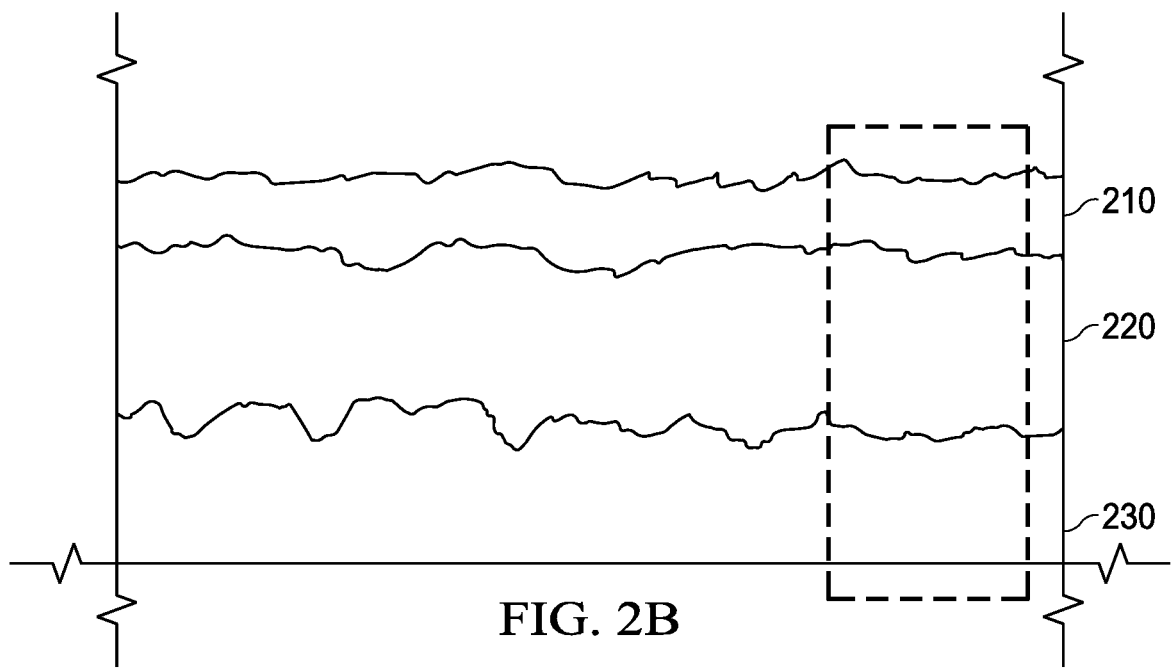
FIG. 2B is a detail cross-sectional view of the example electron emitter shown in FIG. 2A.

FIG. 2B illustrates a detail cross-sectional view of electron emitter 200 shown in FIG. 2A. As shown in FIG. 2B, the layers of electron emitter 200 are formed having irregular surfaces. In some embodiments, this irregular surface results in high electric fields concentrating at sharp tips of material on the surfaces and higher electron emission from the material. Thus, the surface roughness may have an inversely proportional relationship with the work function of the surfaces of the layers of electron emitter 200. In some embodiments, a relatively large surface with a relatively high roughness may result in higher electron emission while avoiding large electron flux that may wear away at the surface roughness. As shown in FIG. 2B, the irregular surfaces between all of the layers may provide additional and separate electron field emission. For example, the interface between base layer 230 and layer 220, the interface between layer 220 and upper layer 210, and the surface of upper layer 210 each provide separate electron field emission, which each contribute to the overall electron field emission of electron emitter 200.

As discussed above, base layer 230 may be formed from, e.g., oxide or diamond and may have a rough surface profile. In some embodiments, base layer 230 may be formed through poorly performed diamond coating, resulting in an irregular surface coated in polycrystalline diamond. In other embodiments, base layer 230 may be formed through poorly annealed oxide or oxide having been roughened using chemical, mechanical, or other methods, resulting in an irregular oxide surface having high surface roughness. Layer 220 may then be formed over base layer 230. Layer 220 may also have a rough surface profile, as shown in FIG. 2B. In some embodiments, layer 220 will not have the same surface profile as base layer 230. In some embodiments, layer 220 will be relatively thin in comparison to the thickness of base layer 230. For example, layer 220 may be approximately 250 angstroms thick. Upper layer 210 may then be formed over layer 220. Upper layer 210 may also have a rough surface profile, as shown in FIG. 2B. In some embodiments, upper layer 210 will not have the same surface profile as either layer 220 or base layer 230. In some embodiments, upper layer 210 will be relatively thin in comparison to the thickness of layer 220. For example, upper layer 210 may be approximately 10 angstroms thick. In other embodiments, the layers of electron emitter 200 may have various other dimensions, parameters, and/or configurations.

Figure 3:
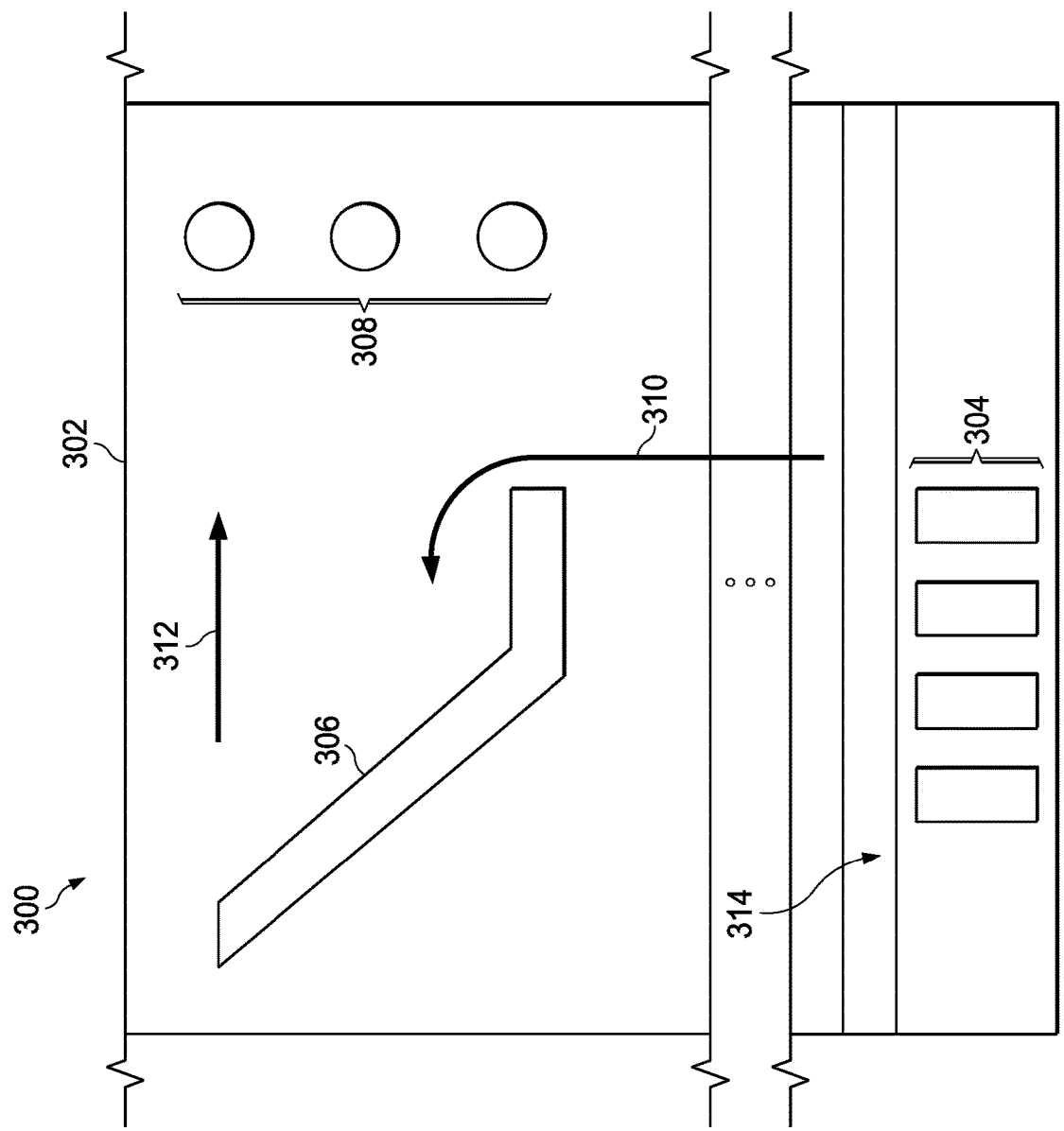
FIG. 3 is a top perspective view of another example system for ionizing and accelerating fluids.

FIG. 3 illustrates a top perspective view of another example system for ionizing and accelerating fluids 300. System 300 includes a substrate 302, an electron emitter 304, an anode 306, and attractors 308. In most respects, system 300 and substrate 302, electron emitter 304, anode 306, and attractors 308 may be configured and function similarly to system 100 and substrate 102, electron emitter 104, anode 106, and attractors 108, as described in reference to FIGS. 1A and 1B, unless otherwise specified below. In some embodiments, system 300 may include a plurality of electron emitters 304. As shown in FIG. 3, electron emitters 304 includes four electron emitters 304. However, electron emitters 304 may include more or fewer electron emitters 304 or may be a single electron emitter 304 in various other embodiments. Each of the plurality of electron emitters 304 may be configured and function similarly to electron emitter 104 and electron emitter 200, as described in reference to FIGS. 1A, 1B, 2A, and 2B. Configuring system 300 with a plurality of electron emitters 304 may result in a higher number of electrons and/or a higher concentration of electrons being emitted.

Electron emitters 304 may emit electrons when electrical current is applied thereto. An electrical field is produced between electron emitters 304 and anode 306 that pulls negatively charged particles, including electrons emitted by electron emitters 304, in the direction of arrow 310. As electrons move through a fluid, the fluid becomes partially ionized as fluid particles become positively charged ions. An electrical field is produced between anode 306 and attractors 308 that pulls positively charged particles, including positively charged fluid ions, in the direction of arrow 312. As fluid ions move in the direction of arrow 312, the ions collide with the rest of the fluid and generate fluid flow in the direction of arrow 312 within a region in proximity to substrate 302.

As shown in FIG. 3, electron emitters 304 may be positioned remotely from anode 306 by some distance. Additionally, in some embodiments, system 300 may include buffer electrode 314 positioned between electron emitters 304 and anode 306. Buffer electrode 314 may be attached to electrical ground and, therefore, may not be positively or negatively biased. When ions are accelerated between anode 306 and attractors 308, ions that are pulled toward electron emitters 304 due to the electric field produced between anode 306 and electron emitters 304 may be intercepted by buffer electrode 314 or may be accelerated at a lesser velocity as buffer electrode 314 may reduce the magnitude of the electric field. Thus, positioning electron emitters 304 remotely from anode 306 and including buffer 314 in system 300 may result in a smaller likelihood of ions colliding with electron emitters 304 after being accelerated to high velocities by the electric field produced between anode 306 and attractors 308. By reducing the likelihood of ions colliding with electron emitters 304, the durability and longevity of electron emitters 304 may be increased.

Additionally, positioning electron emitters 304 remotely from anode 306 allows for ions to be accelerated in a region that is separate from the region in which electrons are being emitted. Thus, functional blocks may be defined within system 300, e.g., a field emitter block may include electron emitters 304 and an ion accelerator block may include anode 306 and attractors 308. Configuring system 300 to include functional blocks may facilitate positioning a plurality of systems, such as system 300, in an array, as described in further detail below in reference to FIGS. 5-6, 7A, 7B, and 8-10.

FIG. 4A illustrates a top perspective view of another example system for ionizing and accelerating fluids 400. System 400 includes a substrate 402, an electron emitter 404, an anode 406, and attractors 408. In most respects, system 400 and substrate 402, electron emitter 404, anode 406, and attractors 408 may be configured and function similarly to system 100 and substrate 102, electron emitter 104, anode 106, and attractors 108, as described in reference to FIGS. 1A and 1B, and/or system 300 and substrate 302, electron emitters 304, anode 306, and attractors 308, unless otherwise specified below. As shown in FIG. 4A, system 400 may include anode 406 that is formed as a cantilever structure positioned vertically over electron emitter 404. However, in some embodiments, system 400 may include electron emitter 404 as a cantilever structure and anode 406 formed on substrate 402. System 400 may also include trench 416 formed between anode 406 and attractors 408. However, in some embodiments, trench 416 may be omitted.

FIG. 4B illustrates a side perspective view of system 400 also shown in FIG. 4A. Electron emitter 404 may emit electrons when electrical current is applied thereto. An electrical field is produced between electron emitter 404 and anode 406 that pulls negatively charged particles, including electrons emitted by electron emitter 404, in the direction of arrow 410. As electrons move through a fluid, the fluid becomes partially ionized as fluid particles become positively charged ions. An electrical field is produced between anode 406 and attractors 408 that pulls positively charged particles, including positively charged fluid ions, in the direction of arrow 412. As fluid ions move in the direction of arrow 412, the ions collide with the rest of the fluid and generate fluid flow in the direction of arrow 412 within a region in proximity to substrate 402.

Figure 5:
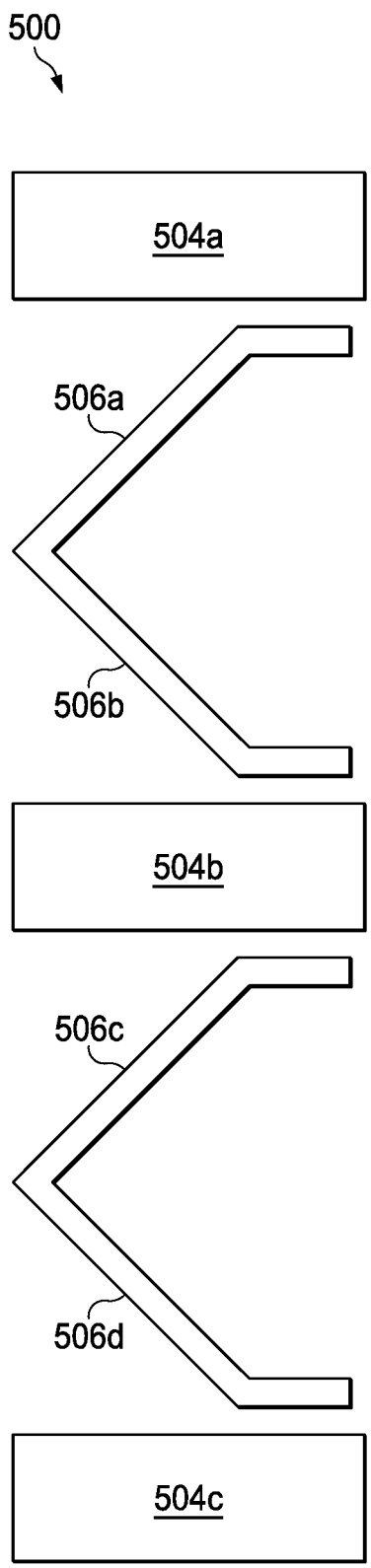
FIG. 5 is a top perspective view of an example array of systems for ionizing and accelerating fluids.

FIG. 5 illustrates a top perspective view of an example array of systems for ionizing and accelerating fluids 500. Array 500 may include a plurality of electron emitters 504a, 504b, 504c, a plurality of anodes 506a, 506b, 506c, 506d, and a plurality of attractors 508. In most respects, electron emitters 504a, 504b, 504c, anodes 506a, 506b, 506c, 506d, and attractors 508 may be configured and function similarly to electron emitter 104, anode 106, and attractors 108, as described in reference to FIGS. 1A and 1B, and/or electron emitters 304, anode 306, and attractors 308, as described in reference to FIG. 3, unless otherwise specified below. In some embodiments, electron emitters 504a, 504b, 504c may include one or more electron emitters 504, as describe above in reference to FIGS. 1A, 1B, and 3. In other embodiments, electron emitters 504a, 504b, 504c may also include one or more buffer electrodes (not shown in FIG. 5), as described above in reference to FIG. 3. As shown in FIG. 5, anode 506a and anode 506b, and anode 506c and anode 506d, are connected together at the end of angled portions to form a symmetric structure. The symmetrically positioned anodes 506 are alternatively positioned with electron emitters 504 in a repeating pattern to form array 500. As shown in FIG. 5, array 500 includes three electron emitters 504 and four anodes 506. However, array 500 may include more or fewer electron emitters 504 or anodes 506 in various other embodiments. In some embodiments, array 500 may include a large number of electron emitters 504, anodes 506, and attractors 508 and may include both rows and columns of repeating patterns of electron emitters 504, anodes 506, and attractors 508.

Figure 6:
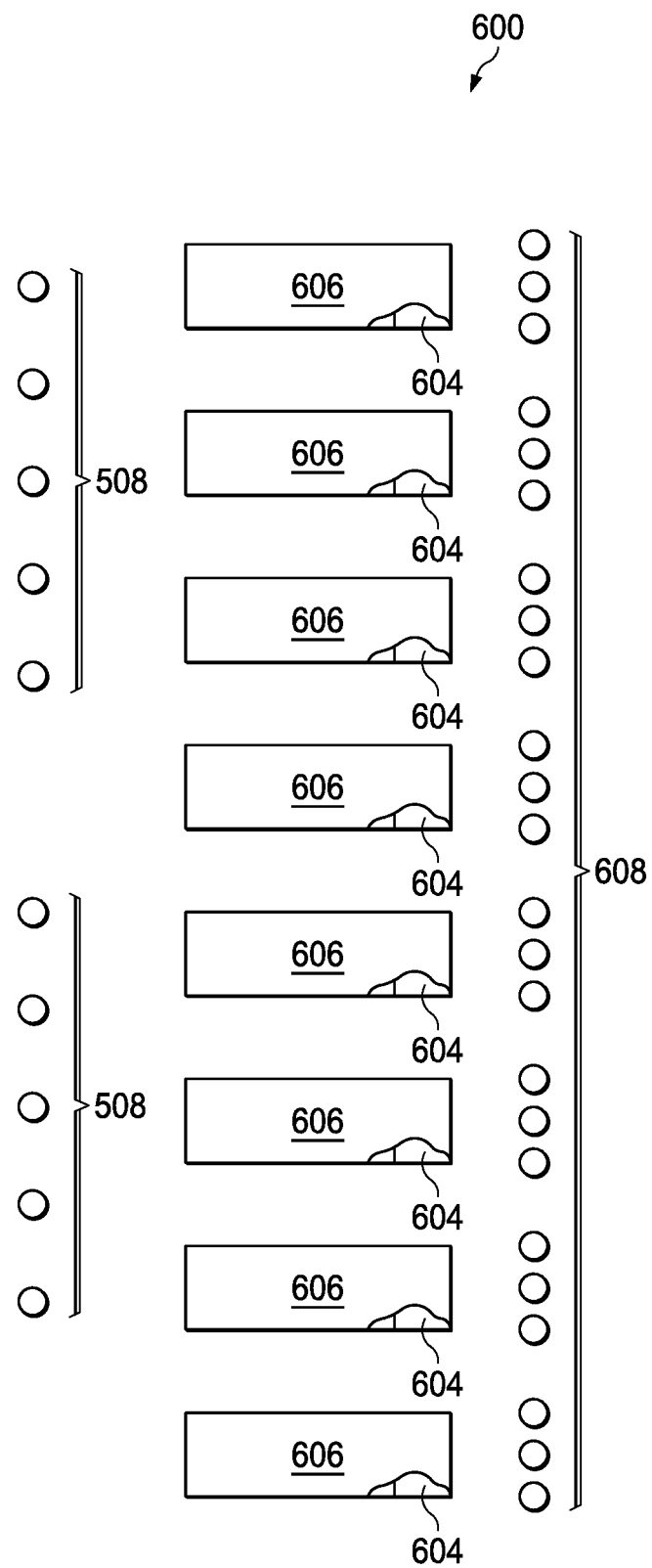
FIG. 6 is a top perspective view of another example array of systems for ionizing and accelerating fluids.

FIG. 6 illustrates a top perspective view of another example array of systems for ionizing and accelerating fluids 600. Array 600 may include a plurality of electron emitters 604, a plurality of anodes 606, and a plurality of attractors 608. In most respects, electron emitters 604, anodes 606, and attractors 608 may be configured and function similarly to electron emitter 404, anode 406, and attractors 408, as described in reference to FIGS. 4A and 4B, unless otherwise specified below. In some embodiments, array 600 may include more or fewer electron emitters 604 or anodes 606 than the number shown in FIG. 6 in various other embodiments. In some embodiments, array 600 may include a large number of electron emitters 604, anodes 606, and attractors 608 and may include both rows and columns of electron emitters 604, anodes 606, and attractors 608.

Figure 7A:
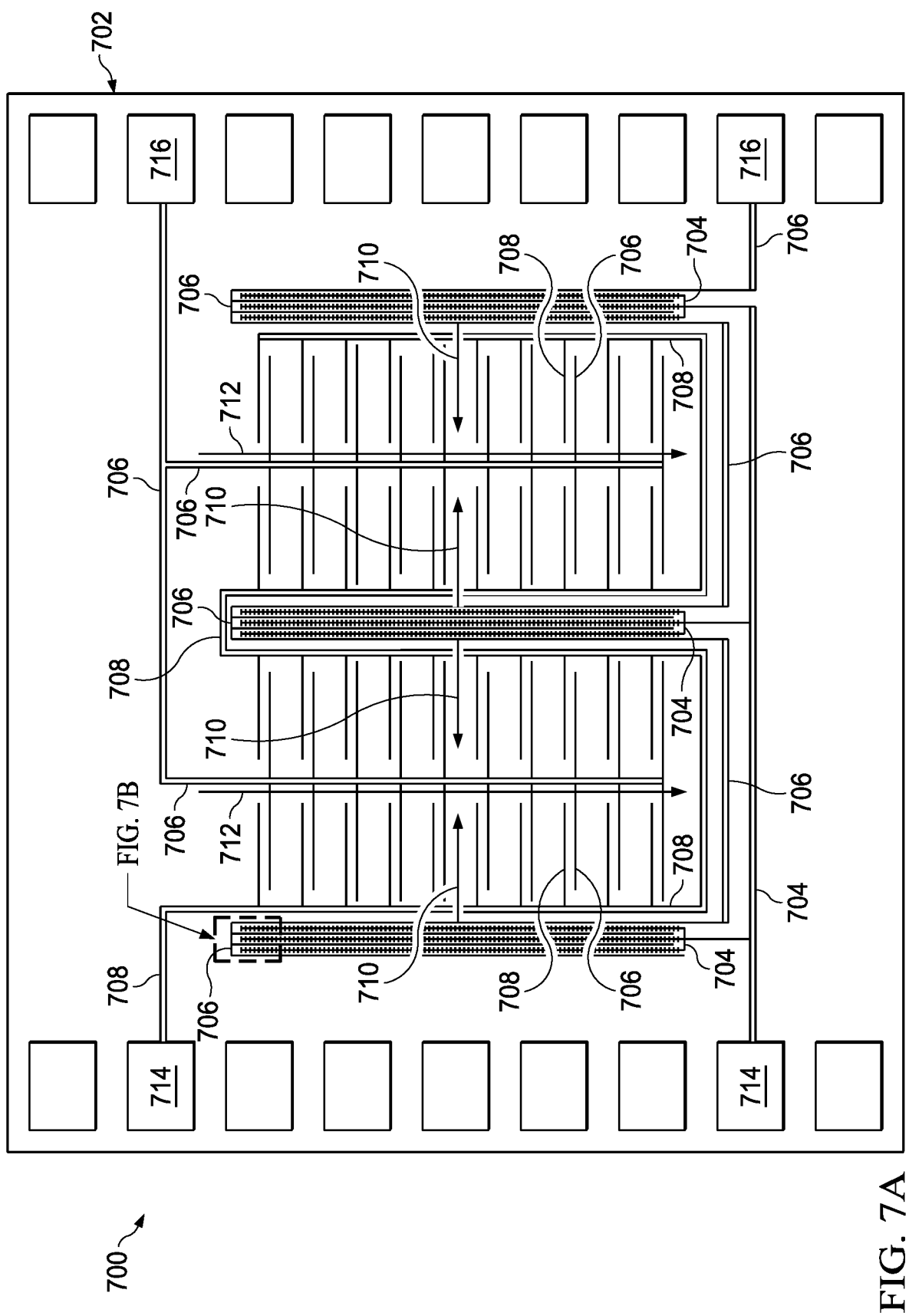
FIG. 7A is a top perspective view of another example array of systems for ionizing and accelerating fluids.

FIG. 7A illustrates a top perspective view of another example array of systems for ionizing and accelerating fluids 700. System 700 may include a substrate 702, a plurality of electron emitters 704, a plurality of anodes 706, and a plurality of attractors 708. In most respects, substrate 702, the plurality of electron emitters 704, the plurality of anodes 706, and the plurality of attractors 708 may be configured and function similarly to substrate 102, electron emitter 104, anode 106, and attractors 108, as described in reference to FIGS. 1A and 1B, and/or substrate 302, electron emitters 304, anode 306, and attractors 308, as described in reference to FIG. 3, unless otherwise specified below. The plurality of electron emitters 704 may be connected to negatively biased electrical power source 714. As shown in FIG. 7A, the plurality of electron emitters 704 are positioned in a repeating column structure with three groups of three columns of electron emitters 704. However, the plurality of electron emitters 704 may be configured in different numbers, positions, and/or orientations in various other embodiments. For example, the plurality of electron emitters 304 may include more or fewer electron emitters 304 or more or fewer columns of electron emitters 304 in various other embodiments. Configuring system 700 with a larger number of electron emitters 304 or a higher density of electron emitters 304 may result in a higher number of electrons and/or a higher concentration of electrons being emitted. The plurality of anodes 706 may be connected to positively biased electrical power source 716. As shown in FIG. 7A, some of the plurality of anodes 706 are positioned in an elongated structure surrounding each column of the plurality of electron emitters 704. However, the plurality of anodes 706 may be configured in different positions and/or orientations in various other embodiments. As shown in FIG. 7B, the plurality of electron emitters 704 are densely repeated within each column and the plurality of anodes 706 surround each column on at least three sides.

As shown in FIG. 7A, others of the plurality of anodes 706 are positioned in a repeating column structure in a number of regions that are positioned remotely from the columns containing the plurality of electron emitters 704 and the surrounding plurality of anodes 706. The plurality of attractors 708 may be connected to negatively biased electrical power source 714. As shown in FIG. 7A, the plurality of attractors 708 are position in a repeating column structure in the regions positioned remotely from the columns containing the plurality of electron emitters 704 and the surrounding plurality of anodes 706. As also shown in FIG. 7A, the repeating column structure of the plurality of attractors 708 is interlaced with the repeating column structure of the plurality of anodes 706 such that each of the plurality of anodes 706 is positioned alternating with and opposing each of the plurality of attractors 708 in a repeating column structure. Each of the plurality of anodes 706 may be positioned such that one anode 706 is positioned between two of the plurality of attractors 708 and the anode 706 is closer to one attractor 708 than the other. Positioning the anode 706 farther from one attractor 708 than the other may provide adequate space for ions to be accelerated to desired velocities. However, the plurality of anodes 706 and the plurality of attractors 708 may be configured in different positions and/or orientations in various other embodiments.

Additionally, positioning the columns containing the plurality of electron emitters 704 and the surrounding plurality of anodes 706 remotely from the interlaced plurality of anodes 706 and plurality of attractors 708 allows for ions to be accelerated in a region that is separate from the region in which electrons are being emitted. Thus, functional blocks may be defined within system 700, e.g., a field emitter block may include the plurality of electron emitters 704 and the surrounding plurality of anodes 706 and an ion accelerator block may include the interlaced plurality of anodes 706 and plurality of attractors 708. Configuring system 700 to include functional blocks may allow for a higher density of both field emitter blocks and ion accelerator blocks being included in a given area.

The plurality of electron emitters 704 may emit electrons when electrical current is applied thereto. An electrical field is produced between the plurality of electron emitters 704 and the plurality of anodes 706 that pulls negatively charged particles, including electrons emitted by the plurality of electron emitters 704, in the direction of arrows 710. As electrons move through a fluid, the fluid becomes partially ionized as fluid particles become positively charged ions. An electrical field is produced between the plurality of anodes 706 and the plurality of attractors 708 that pulls positively charged particles, including positively charged fluid ions, in the direction of arrows 712. As fluid ions move in the direction of arrows 712, the ions collide with the rest of the fluid and generate fluid flow in the direction of arrows 712 within a region in proximity to substrate 702.

Figure 8:
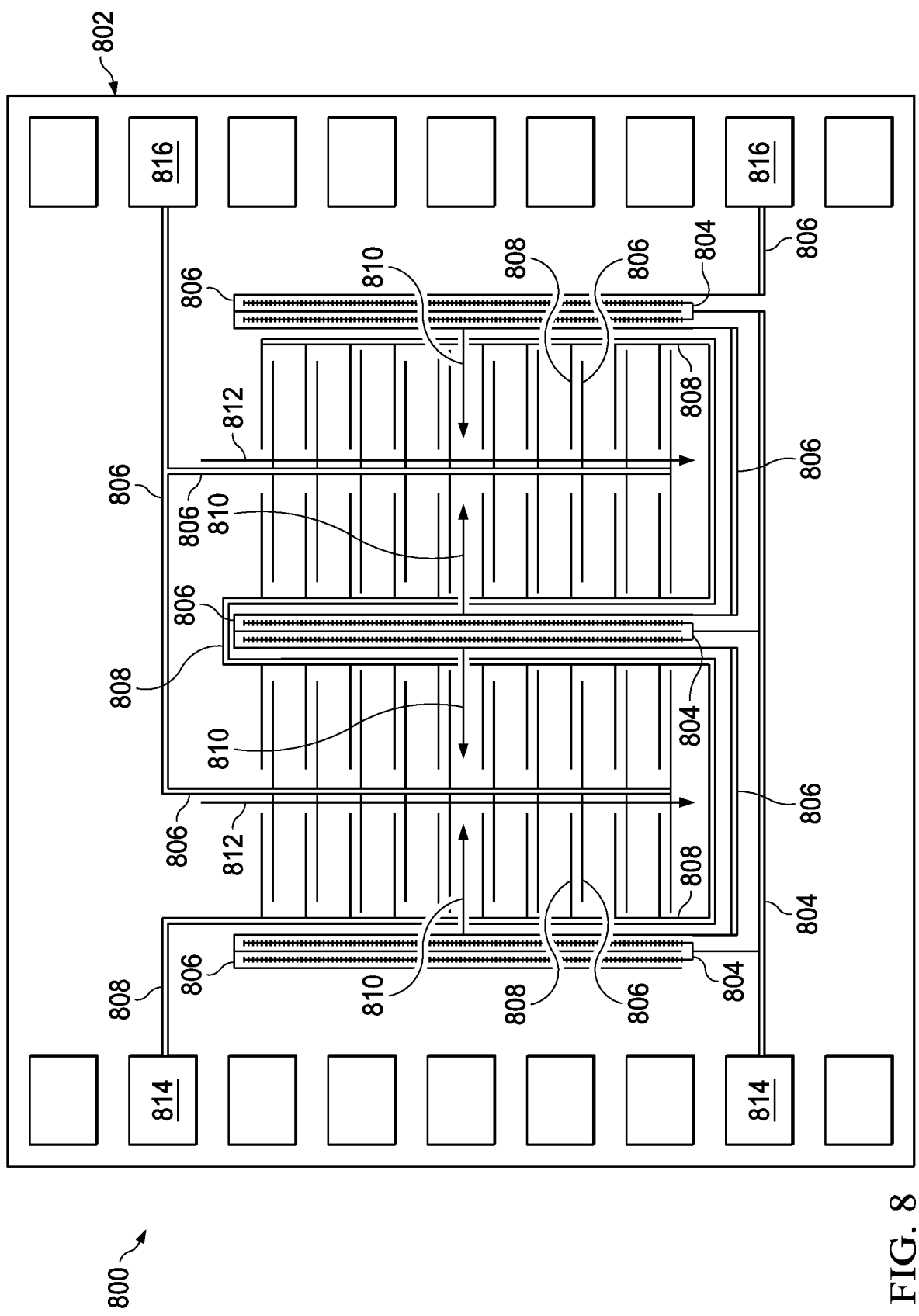
FIG. 8 is a top perspective view of another example array of systems for ionizing and accelerating fluids.

FIG. 8 illustrates a top perspective view of another example array of systems for ionizing and accelerating fluids 800. System 800 may include a substrate 802, a plurality of electron emitters 804, a plurality of anodes 806, and a plurality of attractors 808. In most respects, substrate 802, the plurality of electron emitters 804, the plurality of anodes 806, and the plurality of attractors 808 may be configured and function similarly to substrate 702, plurality of electron emitters 704, plurality of anodes 706, and plurality of attractors 708, as described in reference to FIGS. 7A and 7B, unless otherwise specified below. As shown in FIG. 8, the plurality of electron emitters 804 are positioned in a repeating column structure with three groups of two columns of electron emitters 804. Configuring system 800 with two columns, as opposed to three columns, of electron emitters 804 may reduce the overall number of electron emitters 804. However, in some embodiments, the plurality of anodes 806 surrounding the columns of electron emitters 804 may be formed having a substantially larger height with respect to substrate 802 than the height of electron emitters 804 with respect to substrate 802. Configuring anodes 806 to have a larger height may increase the strength of the electric field generated between the plurality of electron emitters 804 and the plurality of anodes 806. Thus, although the overall number and/or density of electron emitters 804 included in system 800 may be reduced, system 800 may still generate a high number of electrons and/or a high concentration of electrons.

Figure 9:
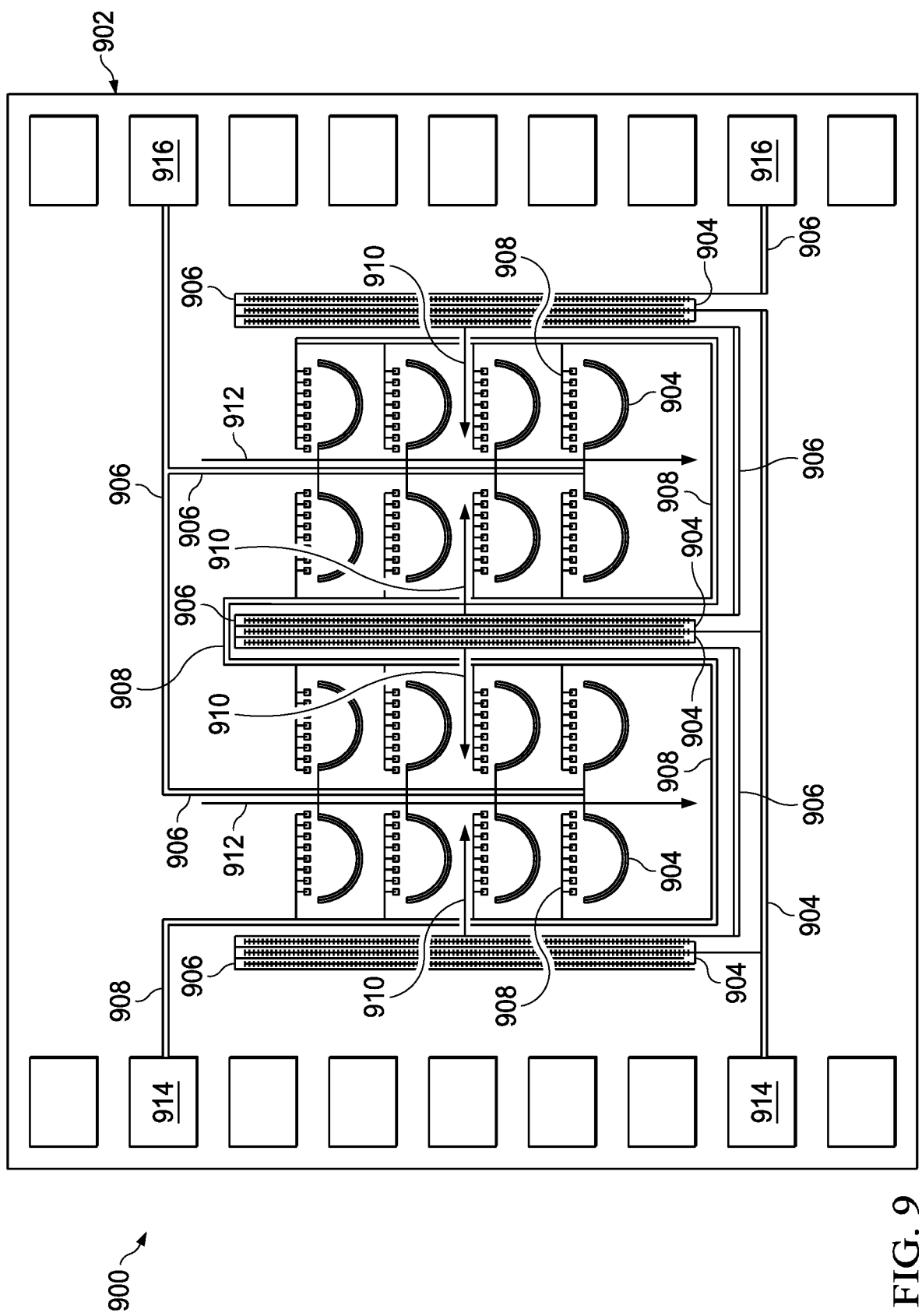
FIG. 9 is a top perspective view of another example array of systems for ionizing and accelerating fluids.

FIG. 9 illustrates a top perspective view of another example array of systems for ionizing and accelerating fluids 900. System 900 may include a substrate 902, a plurality of electron emitters 904, a plurality of anodes 906, and a plurality of attractors 908. In most respects, substrate 902, the plurality of electron emitters 904, the plurality of anodes 906, and the plurality of attractors 908 may be configured and function similarly to substrate 702, plurality of electron emitters 704, plurality of anodes 706, and plurality of attractors 708, as described in reference to FIGS. 7A and 7B, and/or substrate 802, the plurality of electron emitters 804, the plurality of anodes 806, and the plurality of attractors 808, as described in reference to FIG. 8, unless otherwise specified below. As shown in FIG. 9, the plurality of anodes 906 includes semi-circular structures within its repeating column structure, while the plurality of attractors 908 includes a plurality of square structures or a comb-like structure within its repeating column structure.

Figure 10:
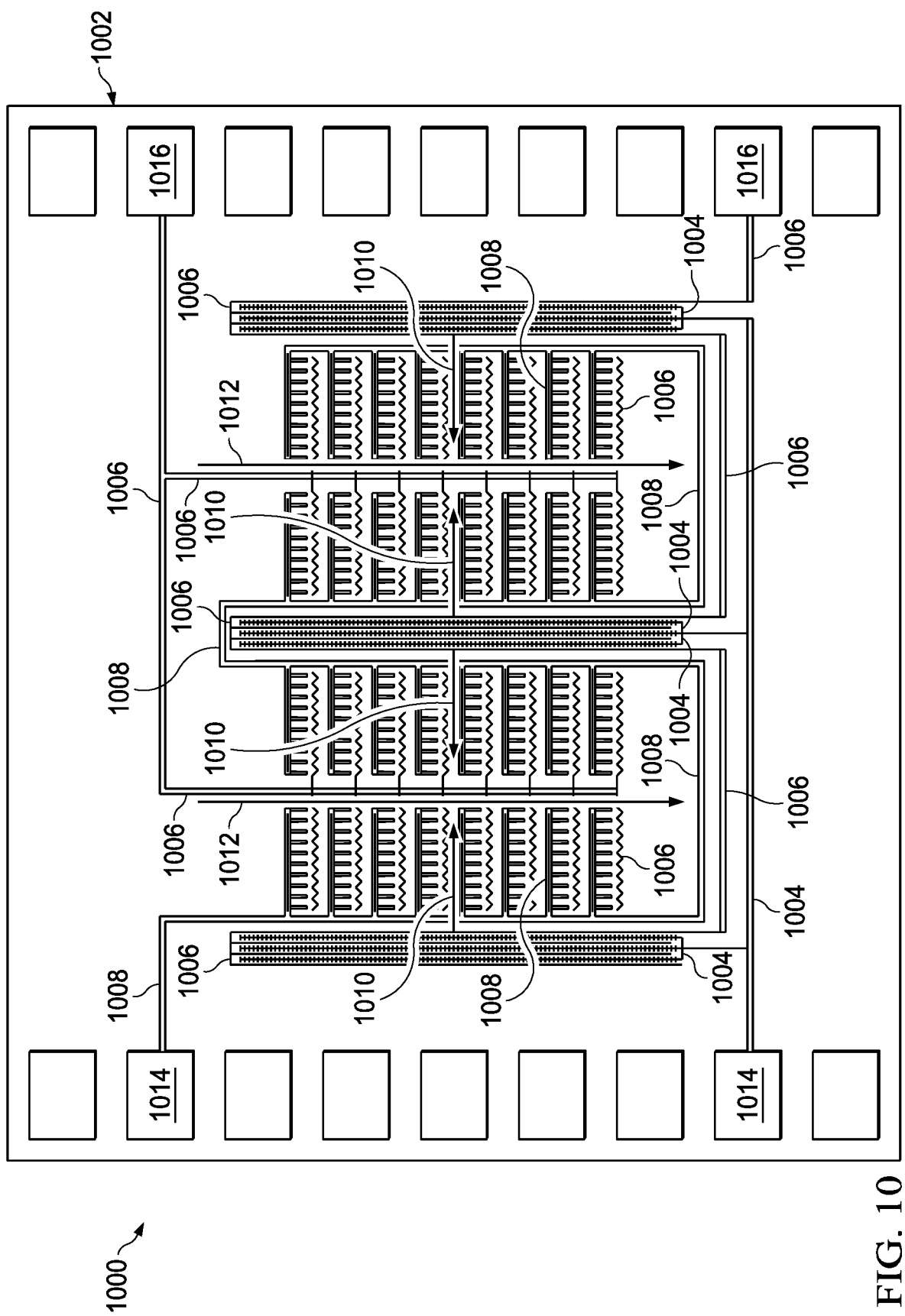
FIG. 10 is a top perspective view of another example array of systems for ionizing and accelerating fluids.

FIG. 10 illustrates a top perspective view of another example array of systems for ionizing and accelerating fluids 1000. System 1000 may include a substrate 1002, a plurality of electron emitters 1004, a plurality of anodes 1006, and a plurality of attractors 1008. In most respects, substrate 1002, the plurality of electron emitters 1004, the plurality of anodes 1006, and the plurality of attractors 1008 may be configured and function similarly to substrate 702, plurality of electron emitters 704, plurality of anodes 706, and plurality of attractors 708, as described in reference to FIGS. 7A and 7B, substrate 802, the plurality of electron emitters 804, the plurality of anodes 806, and the plurality of attractors 808, as described in reference to FIG. 8, and/or substrate 902, the plurality of electron emitters 904, the plurality of anodes 906, and the plurality of attractors 908, as described in reference to FIG. 9, unless otherwise specified below. As shown in FIG. 10, the plurality of anodes 1006 includes zig-zag shaped structures within its repeating column structure, while the plurality of attractors 1008 includes a plurality of square structures or a comb-like structure within its repeating column structure. Although FIGS. 7A, 7B, and 8-10 show systems 700-1000 in specific configurations, systems 700-1000 and the components thereof may be configured having different shapes, positions, and/or orientations in various other embodiments.

Figure 11:
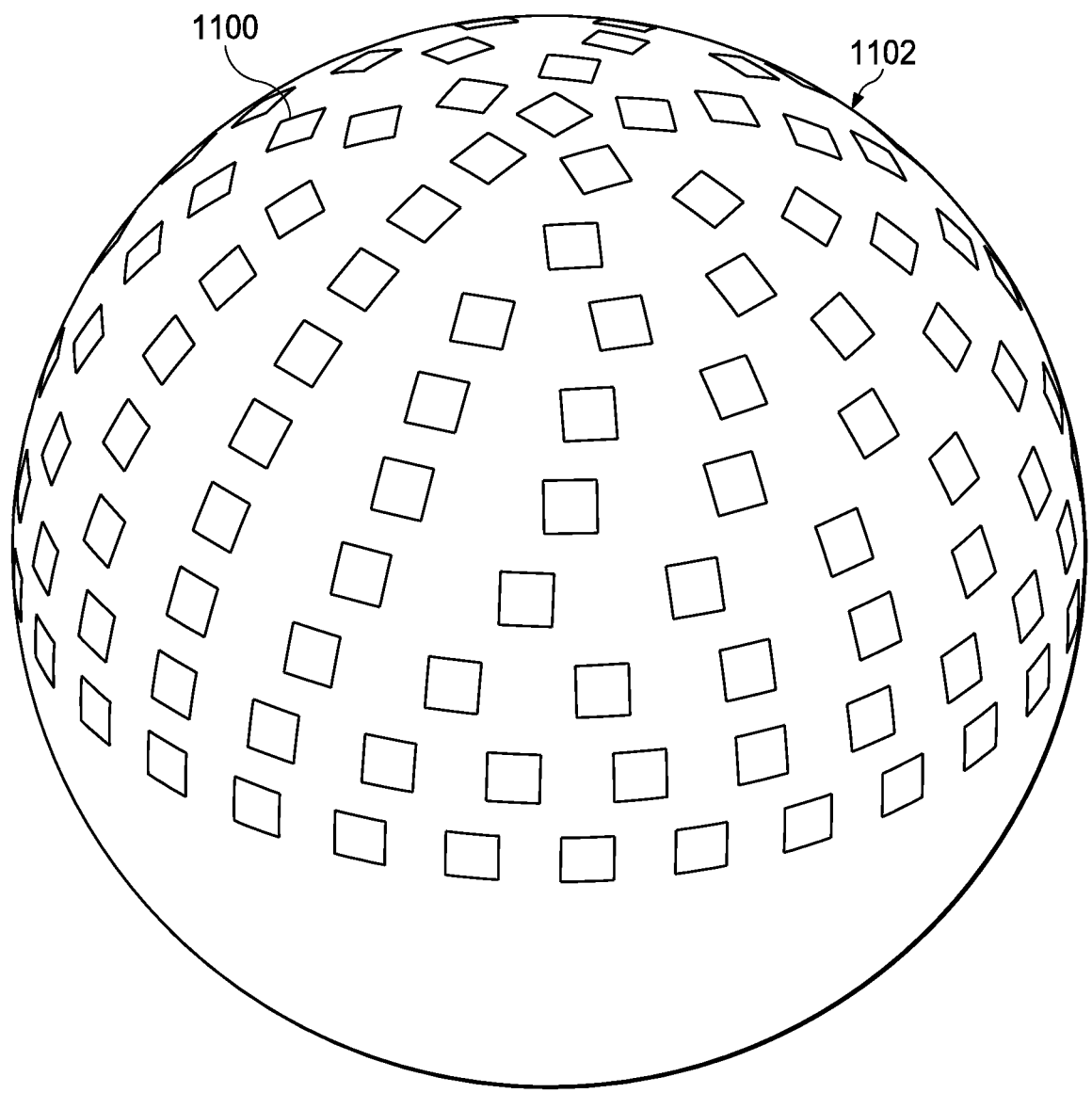
FIG. 11 is a perspective view of an example payload having an array of systems for ionizing and accelerating fluids attached thereto.

FIG. 11 illustrates a perspective view of an example payload 1102 having a plurality of systems for ionizing and accelerating fluids 1100 attached thereto. The plurality of systems 1100 may be attached to payload 1102 and may generate fluid flow that may provide payload 1102 with lift, thrust, or other directional control. Each of the plurality of systems 1100 may include one or more systems for ionizing and accelerating fluids that may be configured and function similarly to systems 100, 300, 400, 500, 600, 700, 800, 900, or 1000, as described above. In some embodiments, the plurality of systems 1100 may provide sufficient fluid flow to provide sufficient lift and six degree of freedom maneuvering for sustained flight and control of payload 1102. In some embodiments, the plurality of systems 1100 may provide approximately 25 grams of thrust per Watt. As shown in FIG. 11, payload 1102 is a spherical shape and the plurality of systems 1100 are positioned on an upper portion of payload 1102. Fluid flow produced by the plurality of systems 1100 may increase the velocity of fluid and reduce the pressure of fluid in proximity to the top of payload 1102 to provide lift. In various embodiments, the plurality of systems 1100 may be positioned in specific orientations to provide for directional control in addition to lift for payload 1102, as described in reference to FIGS. 13A-13C.

Figure 12:
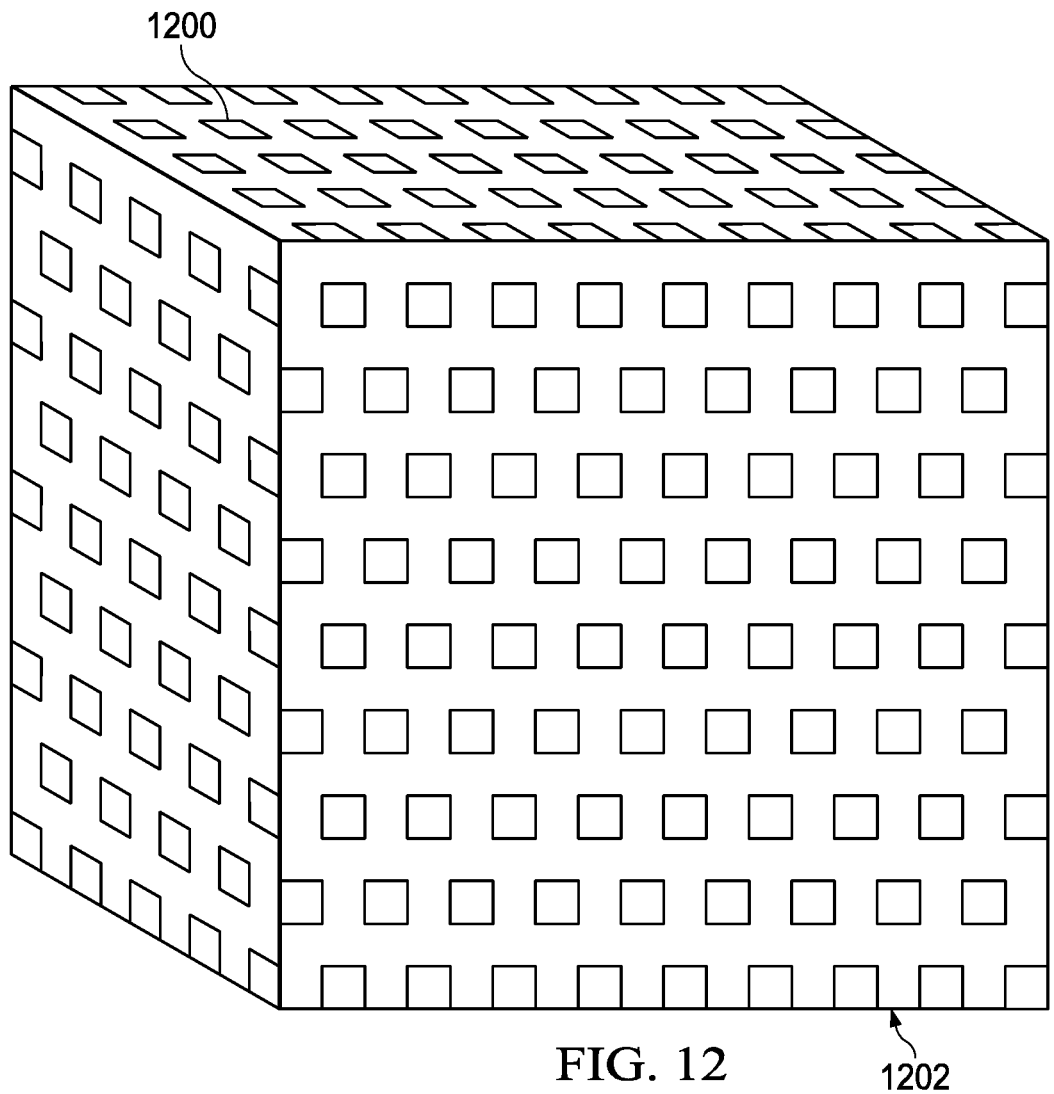
FIG. 12 is a perspective view of another example payload having an array of systems for ionizing and accelerating fluids attached thereto.

FIG. 12 illustrates a perspective view of another example payload 1202 having a plurality of systems for ionizing and accelerating fluids 1200 attached thereto. The plurality of systems 1200 may be attached to payload 1202 and may generate fluid flow that may provide payload 1202 with lift, thrust, or other directional control. The plurality of systems 1200 may be may be configured and function similarly to the plurality of systems 1100, as described above. As shown in FIG. 12, payload 1202 is a cube shape and the plurality of systems 1200 are positioned over the entire surface of payload 1102. In some embodiments, the plurality of systems 1200 may provide sufficient fluid flow to provide six degree of freedom maneuvering for sustained flight and control of payload 1202. In various embodiments, the plurality of systems 1200 may be positioned in specific orientations to provide for full directional control of payload 1202, as described in reference to FIGS. 13A-13C.

Figure 13A:
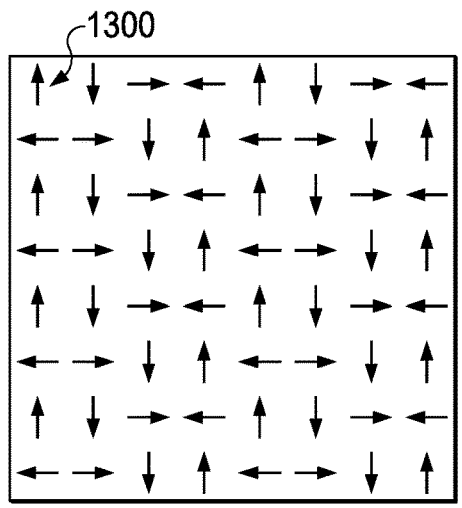
FIG. 13A is a schematic illustrating an example configuration for an array of systems for ionizing and accelerating fluids.

FIG. 13A illustrates an example schematic configuration for a plurality of systems for ionizing and accelerating fluids 1300. Each of the plurality of systems 1300 may be configured and function similarly to systems 100, 300, 400, 500, 600, 700, 800, 900, or 1000, as described above. As shown in FIG. 13A, each system 1300 may be oriented to provide a specific directional thrust, as represented by an arrow indicating the direction of thrust provided. For example, the plurality of systems 1300 may be configured such that each successive system 1300 is oriented to provide a different directional thrust than the previous or following system 1300. As shown, a first system 1300 may provide thrust in a first vertical direction, a second system 1300 may provide thrust in a second vertical direction, a third system 1300 may provide thrust in a first lateral direction, and a fourth system 1300 may provide thrust in a second lateral direction. This pattern may continue throughout the plurality of systems 1300. The amount of fluid flow provided by each of the plurality of systems 1300 may be controlled, and, thus, the plurality of systems 1300 may provide desired lift, thrust, and directional control for a payload.

Figure 13B:
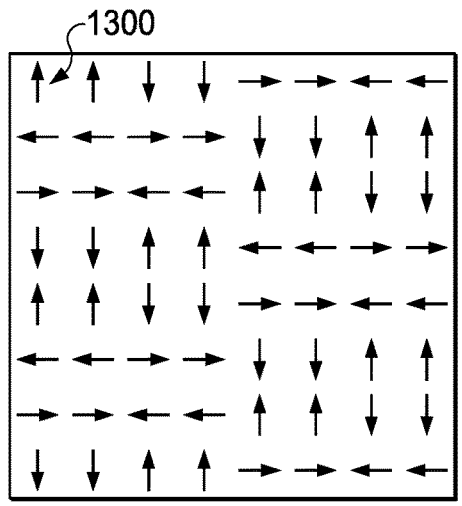
FIG. 13B is a schematic illustrating another example configuration for an array of systems for ionizing and accelerating fluids.

FIG. 13B illustrates another example schematic configuration for the plurality of systems for ionizing and accelerating fluids 1300. As shown in FIG. 13B, the plurality of systems 1300 may be configured such that more than one successive system 1300 is oriented to provide a directional thrust. As shown, two or more systems 1300 may provide thrust in a first vertical direction, a second set of two or more second systems 1300 may provide thrust in a second vertical direction, a third set of two or more systems 1300 may provide thrust in a first lateral direction, and a fourth set of two or more systems 1300 may provide thrust in a second lateral direction. This pattern may continue throughout the plurality of systems 1300.

Figure 13C:
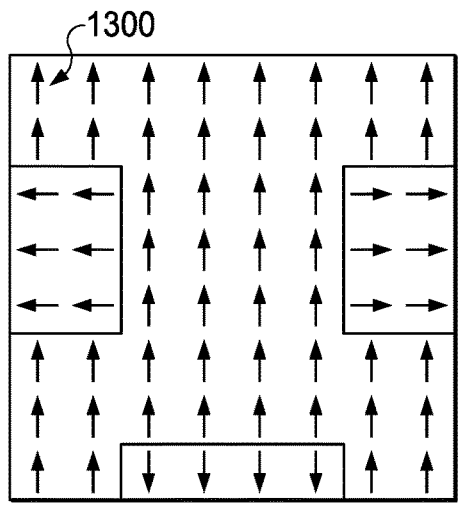
FIG. 13C is a schematic illustrating another example configuration for an array of systems for ionizing and accelerating fluids.

FIG. 13C illustrates another example schematic configuration for a plurality of systems for ionizing and accelerating fluids 1300. As shown in FIG. 13C, the plurality of systems 1300 may be configured such that systems 1300 are divided into regions and all systems 1300 within a specific region are oriented to provide a directional thrust. As shown, the majority of the plurality of systems 1300 may provide thrust in a first vertical direction, e.g., in the direction of lift, a second set of systems 1300 may provide thrust in a second vertical direction, a third set of systems 1300 may provide thrust in a first lateral direction, and a fourth set of systems 1300 may provide thrust in a second lateral direction.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. An ionizing fluidic accelerator comprising:
   a substrate;
   an electron emitter having a negative bias and being formed on the substrate;
   an anode having a positive bias and being formed on the substrate; and
   an attractor having a negative bias and being formed on the substrate;
   wherein the electron emitter and the anode are separated in a first direction and the negative bias of the electron emitter and the positive bias of the anode produce a first electric field in the first direction;
   wherein the anode and the attractor are separated in a second direction, the positive bias of the anode and the negative bias of the attractor produce a second electric field in the second direction, and the second direction is orthogonal to the first direction;
   wherein the first electric field causes negatively charged particles to flow in the first direction from the electron emitter toward the anode; and
   wherein the second electric field causes positively charged particles to flow in the second direction from the anode to the attractor.

2. The ionizing fluidic accelerator of claim 1, wherein the attractor comprises a plurality of attractors.

3. The ionizing fluidic accelerator of claim 1, wherein the electron emitter has a first height relative to the substrate, the anode has a second height relative to the substrate, and the attractor has a third height relative to the substrate, and the third height is substantially greater than the first height and the second height.

4. The ionizing fluidic accelerator of claim 1, wherein the electron emitter has a first height relative to the substrate, the anode has a second height relative to the substrate, and the attractor has a third height relative to the substrate, and the second height is substantially greater than the first height and the third height.

5. The ionizing fluidic accelerator of claim 1, wherein the electron emitter is formed from a plurality of materials layered together.

6. The ionizing fluidic accelerator of claim 5, wherein the plurality of materials comprises a plurality of surfaces, each of the plurality of surfaces has an irregular surface profile, and at least one of the plurality of materials has a high electron emissivity.

7. The ionizing fluidic accelerator of claim 6, wherein the at least one of the plurality of materials having a high electron emissivity comprises lanthanum hexaboride.

8. The ionizing fluidic accelerator of claim 1, wherein the electron emitter comprises a plurality of electron emitters.

9. The ionizing fluidic accelerator of claim 1, wherein the electron emitter is positioned remotely from the anode.

10. The ionizing fluidic accelerator of claim 1 further comprising a buffer electrode positioned between the electron emitter and the anode in the first direction.

11. The ionizing fluidic accelerator of claim 1, wherein the anode comprises a cantilever structure positioned vertically over the electron emitter.

12. The ionizing fluidic accelerator of claim 1, wherein the electron emitter comprises a plurality of electron emitters, the anode comprises a plurality of anodes, the attractor comprises a plurality of attractors, and the plurality of electron emitters, the plurality of anodes, and the plurality of attractors are configured in a repeating array.

13. The ionizing fluidic accelerator of claim 1, wherein the first electric field causes negatively charged particles to flow in the first direction from the electron emitter toward the anode within a first region, and the second electric field causes positively charged particles to flow in the second direction from the anode to the attractor within a second region, wherein the second region is separate from the first region.

14. A vertical lift system, comprising
a payload;
a plurality of ionizing fluidic accelerators positioned on a surface of the payload, each of the plurality of ionizing fluidic accelerators comprising:
a substrate;
an electron emitter having a negative bias and being formed on the substrate;
an anode having a positive bias and being formed on the substrate; and
an attractor having a negative bias and being formed on the substrate;
wherein the electron emitter and the anode are separated in a first direction and the negative bias of the electron emitter and the positive bias of the anode produce a first electric field in the first direction;
wherein the anode and the attractor are separated in a second direction, the positive bias of the anode and the negative bias of the attractor produce a second electric field in the second direction, and the second direction is orthogonal to the first direction;
wherein the first electric field causes negatively charged particles to flow in the first direction from the electron emitter toward the anode; and
wherein the second electric field causes positively charged particles to flow in the second direction from the anode to the attractor;
wherein the plurality of ionizing fluidic accelerators generates fluid flow and provides directional thrust control for the payload.

15. The vertical lift system of claim 14, wherein the payload is a spherical shape.

16. The vertical lift system of claim 14, wherein the payload is a cube shape.

17. The vertical lift system of claim 14, wherein the electron emitter comprises a plurality of electron emitters, the anode comprises a plurality of anodes, the attractor comprises a plurality of attractors, and the plurality of electron emitters, the plurality of anodes, and the plurality of attractors are configured in a repeating array.

18. The vertical lift system of claim 14, wherein the electron emitter is formed from a plurality of materials layered together, the plurality of materials comprises a plurality of surfaces, each of the plurality of surfaces has an irregular surface profile, and at least one of the plurality of materials has a high electron emissivity.

19. The vertical lift system of claim 14, wherein the first electric field causes negatively charged particles to flow in the first direction from the electron emitter toward the anode within a first region, and the second electric field causes positively charged particles to flow in the second direction from the anode to the attractor within a second region, wherein the second region is separate from the first region.

20. A method of using an ionizing fluidic accelerator comprising:
negatively biasing an electron emitter such that the electron emitter emits electrons;
positively biasing an anode;
separating the electron emitter and the anode in a first direction;
producing a first electric field in the first direction between the negative bias of the electron emitter and the positive bias of the anode;
causing electrons emitted by the electron emitter to flow in the first direction toward the anode, interact with a fluid, and generate positively charged ions in the fluid;
negatively biasing an attractor;
separating the anode and the attractor in a second direction orthogonal to the first direction;
producing a second electric field in the second direction between the positive bias of the anode and the negative bias of the attractor;
causing the positively charged ions in the fluid to flow in the second direction toward the attractor and interact with the fluid; and
generating fluid flow as the positively charged ions in the fluid and a portion of the fluid move in the second direction toward the attractor.

* * * * *